Feb. 18, 1941.　　　G. C. CHRISTY　　　2,231,885
HATCH COVER VENTILATING DEVICE
Filed Oct. 21, 1938　　　2 Sheets-Sheet 1
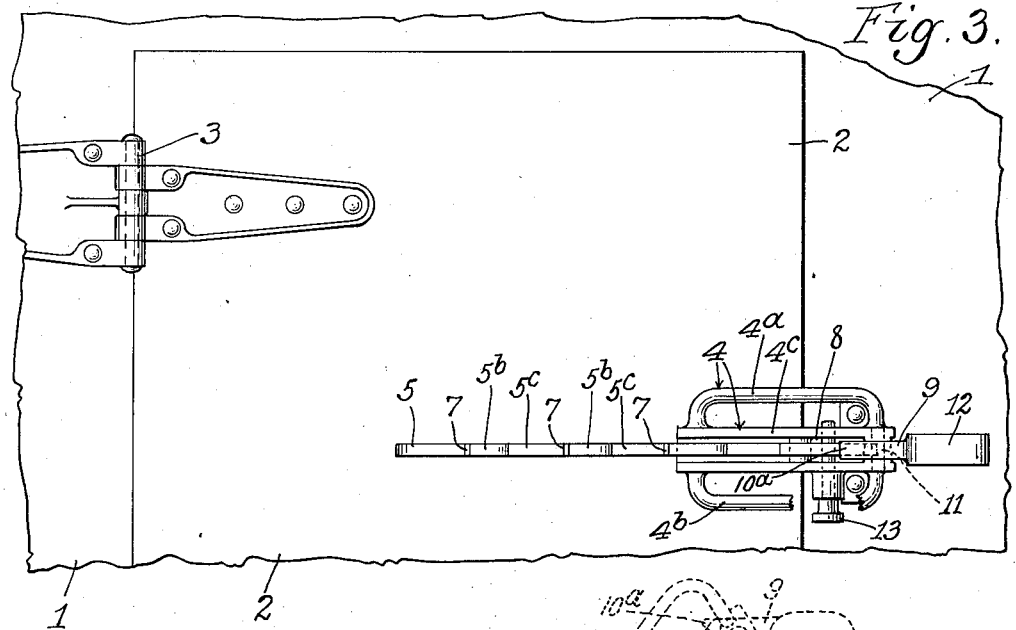
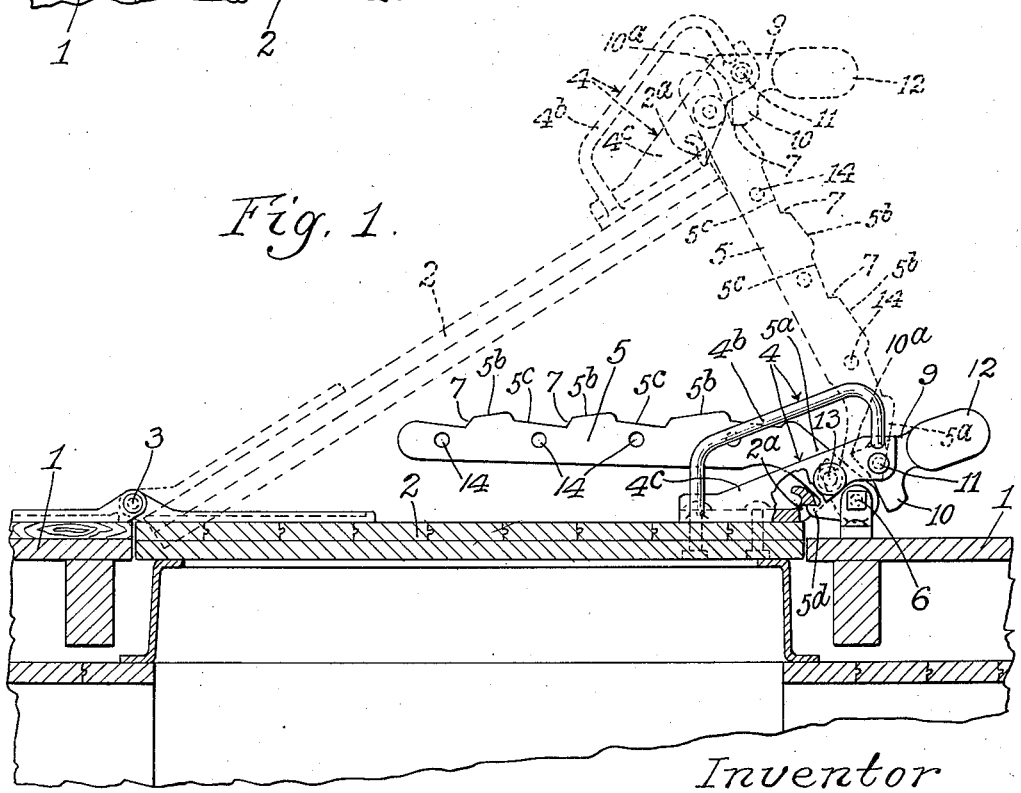
Inventor
George C. Christy
by Parker & Carter
Attorneys.

Feb. 18, 1941.   G. C. CHRISTY   2,231,885
HATCH COVER VENTILATING DEVICE
Filed Oct. 21, 1938   2 Sheets-Sheet 2
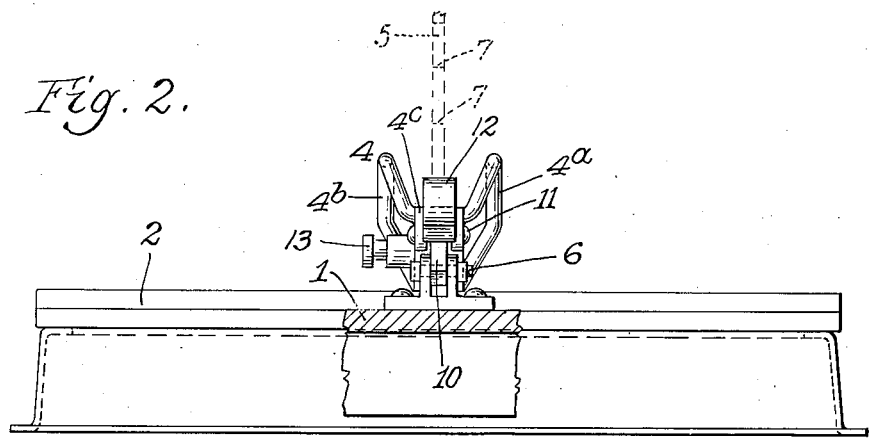
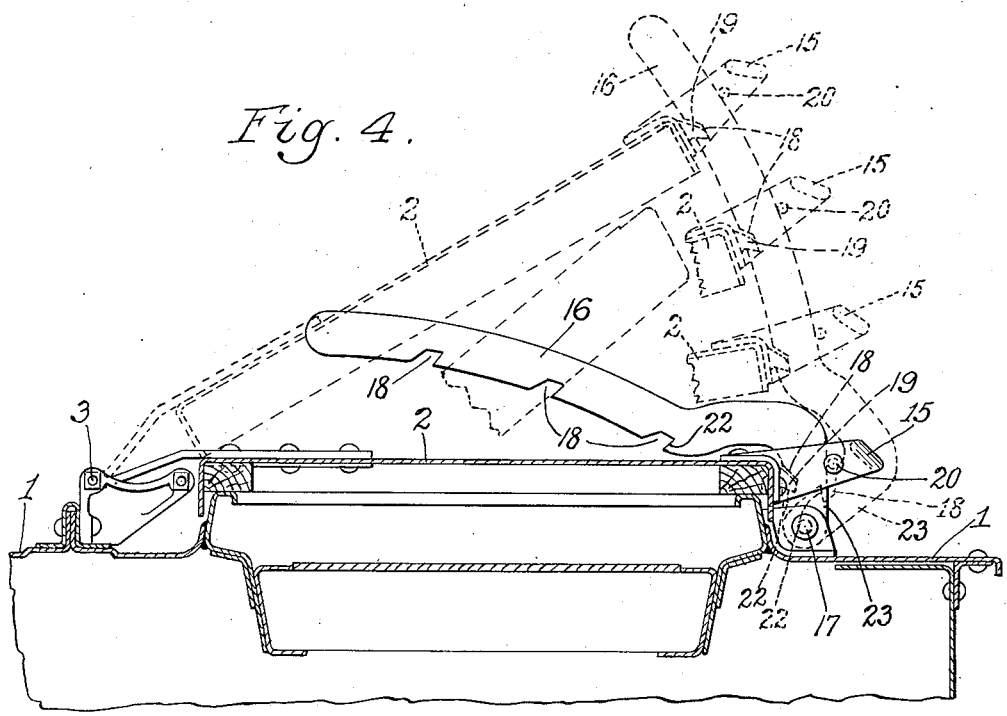
Inventor
George C. Christy
by Parker Carter
Attorneys.

Patented Feb. 18, 1941

2,231,885

UNITED STATES PATENT OFFICE 2,231,885

HATCH COVER VENTILATING DEVICE

George C. Christy, Chicago, Ill.

Application October 21, 1938, Serial No. 236,290

7 Claims. (Cl. 98—7)

This invention relates to hatch cover ventilating devices and has for its object to provide a new and improved device of this description.

In the present refrigerating cars there is provided at each end, a hatch through which ice is inserted into the car. These hatches are provided with covers which can be closed down. The hatch covers are lifted up so as to be partially or fully open, for the purpose of ventilating the cars while in transit. The invention has as a further object to provide a hatch cover ventilating device particularly adapted for railway cars, where the hatch cover is provided with means for easily and quickly moving and holding it in any partially or fully open position.

The invention has as a further object to provide a device of the kind described where by the mere lifting of the hatch cover and releasing it, it will be held in any desired position. The invention has as a further object to provide means for preventing accidental falling of the hatch cover.

The invention has further objects which are more particularly pointed out in the accompanying description.

Referring now to the drawings, Fig. 1 is a view showing a hatch cover and associated parts embodying the invention;

Fig. 2 is a front view of the construction shown in Fig. 1;

Fig. 3 is a plan view of the construction shown in Fig. 1; and

Fig. 4 is a view showing a modified construction.

Like numerals refer to like parts throughout the several figures.

Referring now to the drawings, there is illustrated a portion 1 of a refrigerating car having a hatch opening which is normally closed by a hatch cover 2, which is pivoted at 3. The hatch cover 2 is provided with a handle 4 at the end opposite that where the hinge 3 is located, and by means of which it can be lifted to any desired ventilating position. A support 5 is provided for supporting the hatch cover in any of its open ventilating positions. This support is pivotally mounted at 6 to the top of the car. The support 5 is provided with a series of notches 7 on its outer face, that is the face facing away from the hatch cover. This support is received in a slot 8 in the hatch cover or some associated part. In the particular construction illustrated in Figs. 1, 2 and 3, this slot is in the handle 4. Some means is provided for holding the hatch cover in any of its ventilating positions. As shown in Figs. 1 to 3, there is a holding member consisting of the members 9 and 10 and which is pivoted at 11 to the handle 4. The member 9 is heavier than the member 10 and is preferably provided with a weight 12. When the hatch cover is lifted, the member 10 moves freely along the outer face of the support 5 and when the hatch cover is released, the member 10 automatically falls into one of the notches 7, the weight 12 insuring this action. The hatch cover or some part connected therewith engages the support 5 and maintains it in operative relation to the holding member when the hatch cover is in raised position. When it is desired to lower the hatch cover, the member 10 is moved to release it from the notches 7 by lifting the member 9, and the hatch cover is then lowered to its closing position, or to any intermediate position.

When it is desired to fasten the hatch cover in any of its ventilating positions, this is accomplished by means of a fastening pin 13 which passes through openings 14 in the support 5 and which also may pass through openings in the handle, or may be located beneath the handle so that the handle strikes it and holds the hatch cover in position. This pin may be of any desired form and arrangement. It is of course evident that any other suitable holding device may be used.

In the construction shown, the holding member is provided with a limiting projection 10a which, when the hatch cover is moved, engages the outer face of the support 5 and limits the movement of the member 10 away from the support 5, so as to insure its falling back into the notch each time it comes opposite thereto. This limiting projection is preferably so formed and positioned that when it engages the outer face of the support 5, the member 10 will be out of the notch only a short distance so that it will be sure to drop back into the notch when opposite thereto. When this construction is used, it is not necessary to have the weight 12.

It will further be noted that the support 5 is provided at its lower pivoted end with a bent portion 5a so that when the hatch cover is closed, the support will lie over closely to it, so as to be out of the way. It will also be noted in this construction that the outwardly projecting parts on the support have faces 5b which are inclined with relation to the rear face of the support 5, the inclination varying in degree from the bottom toward the top. It will further be noted that the faces 5c of the notches are also inclined but in an opposite direction, and that this inclination varies from the bottom toward the top of the support.

In the particular construction shown in Figs. 1, 2 and 3, the handle is formed of two loops 4a and 4b which are connected to the hatch cover and which are also connected together by the center piece 4c containing the slot 8.

Fig. 4 shows a modified construction. In this construction the hatch cover 2 is pivoted at 3, as in the other figures, and there is a handle 15 connected to the front end of the hatch cover. The support 16 is pivoted at 17 to the top of the car and is provided with a series of notches 18. The hatch cover is provided with a holding projection 19 which fits into one of the notches 18 when it is desired to hold the hatch cover open. The support 16 projects over the hatch cover, as shown, when the hatch cover is closed. When the hatch cover is lifted, the holding projection moves along the inner face of the support 16 and when it reaches one of the notches, it moves toward the hatch cover so that the holding projection 19 enters the notch. If it is desired to open the hatch cover wider, for example, than is done by the first notch, it is only necessary to continue moving it up, whereupon the holding projection 19 slides out of the notch and along the face of the support and into the next notch. By continually lifting the hatch cover, the holding projection 19 may be brought to the highest notch, and then by releasing the hatch cover, the hatch cover will be held in this position.

The handle 15 is preferably provided with an opening through which a pin 20 may be passed, this pin engaging the outer face of the support so as to prevent the support from being disconnected from the hatch cover. The projection 19 holds the hatch cover in its closed position when the pin 20 is in position as shown in the drawings.

It will be seen that in these constructions it is only necessary to lift the hatch cover and to release it, whereupon the holding member will fall into the appropriate notch and hold the hatch cover in the desired position. There is here provided a cheap, efficient and reliable means for holding the hatch cover open and permitting it to be easily moved to its open position and easily moved to its closed position. The handle for the hatch cover projects beyond the front edge of the hatch cover and beyond the support for the hatch cover and is rigidly connected to the hatch cover. The fastening pin for holding the hatch cover in position engages some part of the handle.

When the support 16 is moved away from its full line position, the lower edge 22 of the lower notch 18 engages the projection 19 on the hatch cover and starts the opening movement of the hatch cover, as the front edge of the hatch cover must be lifted upwardly to start its opening movement, before the projection 19 can be released from the notch 18. This support therefore acts as a lever to give the starting opening movement to the hatch cover so as to make it easy to open the hatch cover. The hatch cover can then be easily lifted to any desired open position and will be held in such position by the projection 19 falling into one of the notches 18. The support 16 is provided at its end with the bent portion 23 which permits it to be moved down near the top of the hatch cover when the hatch cover is closed, so as to be out of the way.

The device of Figs. 1, 2 and 3 has means on the support 5 for engaging the hatch cover to start the opening thereof. Any suitable means for this purpose may be used. As herein shown, the support 5 is provided with a projection 5d which engages the wall of the notch 2a in the base of the handle member 4, as clearly shown in Fig. 1. When it is desired to move the hatch cover to its open position, the support 5 is moved from its full line position towards its dotted line position and the projection 5d engages the wall of the notch 2a, and starts the opening movement of the hatch cover. It will be noted that when the hatch cover is raised, this automatically raises the hatch cover support in position to secure the hatch cover in any of its open positions.

I claim:

1. A hatch cover ventilating device comprising a cover for the hatch, pivotally connected at one edge to the top of the car, a handle at the other edge which projects beyond the edge of the hatch cover, a support for the hatch cover, separate therefrom and pivotally connected to the top of the car adjacent the free edge of said hatch cover, a series of notches on the face of the support facing away from the hatch cover, and a pivoted weighted holding device pivotally connected to and moving with the hatch cover and located on the side of said support remote from the hatch cover and which moves along the face of the support and which automatically falls into one of the notches when the hatch cover is released so as to hold the hatch cover from further downward movement and means associated with the hatch cover engaging said support to maintain it in operative relation to the holding device when the cover is raised.

2. A hatch cover ventilating device comprising a cover for the hatch, pivotally connected at one edge to the top of the car, a handle at the other edge which projects beyond the edge of the hatch cover, a support for the hatch cover, separate therefrom and pivotally connected to the top of the car adjacent the free edge of said hatch cover a series of notches on the face of the support facing away from the hatch cover, and a pivoted holding device pivotally connected to and moving with the hatch cover and located on the side of the support remote from the hatch cover and having two members at an angle to each other, one of the members engaging the face of the support provided with the notches, and the other member being weighted so as to normally hold the first member in any desired notch of the support and means associated with the hatch cover engaging said support to maintain it in operative relation to the holding device when the cover is raised.

3. A hatch cover ventilating device comprising a cover for the hatch, pivotally connected at one edge to the top of the car, a support for the hatch cover separate therefrom and movable with relation to the hatch cover and pivotally connected to the top of the car adjacent to the free edge of the hatch cover for holding the hatch cover in its open position, a plurality of notches on the face of said support facing away from the hatch cover, and a movable engaging device connected with the hatch cover and movable with relation thereto and adapted to engage the notches in said support to hold the hatch cover open said movable engaging device located on the side of the support remote from the hatch cover and means associated with the hatch engaging said support to maintain it in operative relation to the holding device when the cover is raised.

4. A hatch cover ventilating device comprising a cover for the hatch, pivotally connected at one edge to the top of the car, a support for the hatch cover separate therefrom and movable with relation to the hatch cover and pivotally connected to the top of the car adjacent the free edge of the hatch cover for holding the hatch cover in its open position, a plurality of notches on the face of said support facing away from the hatch cover, a pivoted holding member having a pivotal connection with the hatch cover and having a downwardly projecting notch engaging portion on one side of the pivot, which engages the notched face of said support and an upwardly projecting limiting part on the other side of said pivot which engages the notched face of said support for limiting the movement of said notch engaging portion away from the notches, the pivot and the downwardly and upwardly projecting parts of said pivoted holding member located on the side of the support remote from the hatch cover, and means associated with the hatch cover engaging said support to maintain it in operative relation to said notch engaging portion and said limiting part when the cover is raised.

5. A hatch cover ventilating device comprising a cover for the hatch, pivotally connected at one edge to the top of the car, a support for the hatch cover separate from the hatch cover and pivoted to the top of the car, adjacent the free edge of said hatch cover, said support having on the side thereof facing away from the hatch cover, a series of separated projecting portions having inclined faces and a series of intermediate indentations having faces inclined in the opposite direction, stop faces between the upper ends of said projecting portions and the lower ends of said indentations and a holding device pivoted to said hatch cover and having a stop member which engages one of said stop faces as the hatch cover is lowered, to stop the lowering movement of the hatch cover, and means associated with the hatch cover engaging said support to maintain it in operative relation to the holding device when the cover is raised.

6. A hatch cover ventilating device comprising a cover for the hatch, pivotally connected at one edge to the top of the car, a support for the hatch cover separate therefrom and pivotally connected to the top of the car adjacent the free edge of the cover for holding said hatch cover in its open position, a plurality of notches on the face of said support facing away from the hatch cover, a movable engaging device connected with the hatch cover and movable with relation thereto and adapted to engage the notches in said support to hold the hatch cover open, and a limiting projection on said movable engaging device which engages the notched side of said support for limiting the distance said movable engaging device may be moved out of said notches, to insure its falling successively into said notches as the hatch cover is moved along the support and means associated with the hatch cover engaging said support to maintain it in operative relation to the engaging device which engages the notches and said limiting projection when the cover is raised.

7. A hatch cover ventilating device comprising a cover for the hatch, pivotally connected at one edge to the top of the car, a support for the hatch cover separate therefrom and pivotally connected to the top of the car adjacent the free edge of the hatch cover for holding said hatch cover in its open position, said support having on the side thereof facing away from the hatch cover, a series of separated projecting portions having inclined faces and a series of intermediate indentations having faces inclined in the opposite direction, stop faces between the upper ends of said projecting portions and the lower ends of said indentations, a holding device pivoted to said hatch cover and having a stop member which engages one of said stop faces as the hatch cover is lowered, to stop the lowering movement of the hatch cover, and a limiting member which engages the same side of the support as the stop member, for limiting the distance the stop member is moved away from said support, and means associated with the hatch cover engaging said support to maintain it in operative relation to said stop member and said limiting member when the cover is raised.

GEORGE C. CHRISTY.